United States Patent [19]
Connors et al.

[11] Patent Number: 5,411,200
[45] Date of Patent: May 2, 1995

[54] PROCESS AND APPARATUS FOR THE WAVE SOLDERING OF CIRCUIT BOARDS

[75] Inventors: Robert W. Connors, Western Springs; Frederick W. Giacobbe, Naperville; Benjamin Jurcik, Willowbrook; Kevin P. McKean, Naperville, all of Ill.

[73] Assignees: American Air Liquide, Inc.; Air Liquide America Corp., both of Walnut Creek, Calif.

[21] Appl. No.: 202,489

[22] Filed: Feb. 28, 1994

[51] Int. Cl.⁶ .............................. B23K 1/00; B23K 3/00
[52] U.S. Cl. ........................................ 228/219; 228/42
[58] Field of Search ................ 228/180.1, 219, 260, 228/37, 42, 56.2; 118/58, 67

[56] References Cited
U.S. PATENT DOCUMENTS

| | | | |
|---|---|---|---|
| 3,705,457 | 12/1972 | Tardoskegyi | 228/37 |
| 3,924,794 | 12/1975 | Allen et al. | 228/256 |
| 4,538,757 | 9/1985 | Bertiger | 228/37 |
| 4,606,493 | 8/1986 | Christoph et al. | 228/37 |
| 4,610,391 | 9/1986 | Nowotarski | 228/219 |
| 4,646,958 | 3/1987 | Howard, Jr. | 228/220 |
| 4,746,289 | 5/1988 | Guillaume | 432/8 |
| 4,821,947 | 4/1989 | Nowotarski | 228/37 |
| 4,921,156 | 5/1990 | Hohnerlein | 228/37 |
| 5,071,058 | 12/1991 | Nowotarski | 228/219 |
| 5,121,875 | 6/1992 | Hagerty et al. | 228/219 |
| 5,203,489 | 4/1993 | Gileta et al. | 228/219 |
| 5,240,169 | 8/1993 | Gileta | 228/219 |
| 5,364,007 | 11/1994 | Jacobs et al. | 228/219 |

FOREIGN PATENT DOCUMENTS 132268 6/1986 Japan ........................ 228/37

Primary Examiner—Samuel M. Heinrich
Attorney, Agent, or Firm—Burns, Doane, Swecker & Mathis

[57] ABSTRACT

A circuit board is wave soldered as it is carried by a conveyor through a solder wave established in a solder reservoir. Disposed on both sides of the solder wave are gas plenums which discharge shield gas. The gas plenums include orifices for directing shield gas (i) at high velocity toward the solder wave to protect the solder wave with an atmosphere of shield gas, and/or (ii) upwardly toward an underside of the circuit board to strip entrained air therefrom. The solder wave is generated by a pump driven by a drive shaft that extends downwardly into the solder reservoir. An upper portion of the drive shaft is surrounded by a stationary hollow sleeve which projects into the solder reservoir to restrict the churning of the solder during rotation of the drive shaft. A shield gas is introduced into the sleeve to inert the solder being churned. An enclosure is positioned above the solder reservoir having an inlet and an outlet through which the circuit boards are conveyed. Curtains are positioned across portions of the inlet and outlet not occupied by the conveyor, the curtains being automatically adjusted when the width of the conveyor is adjusted.

41 Claims, 6 Drawing Sheets

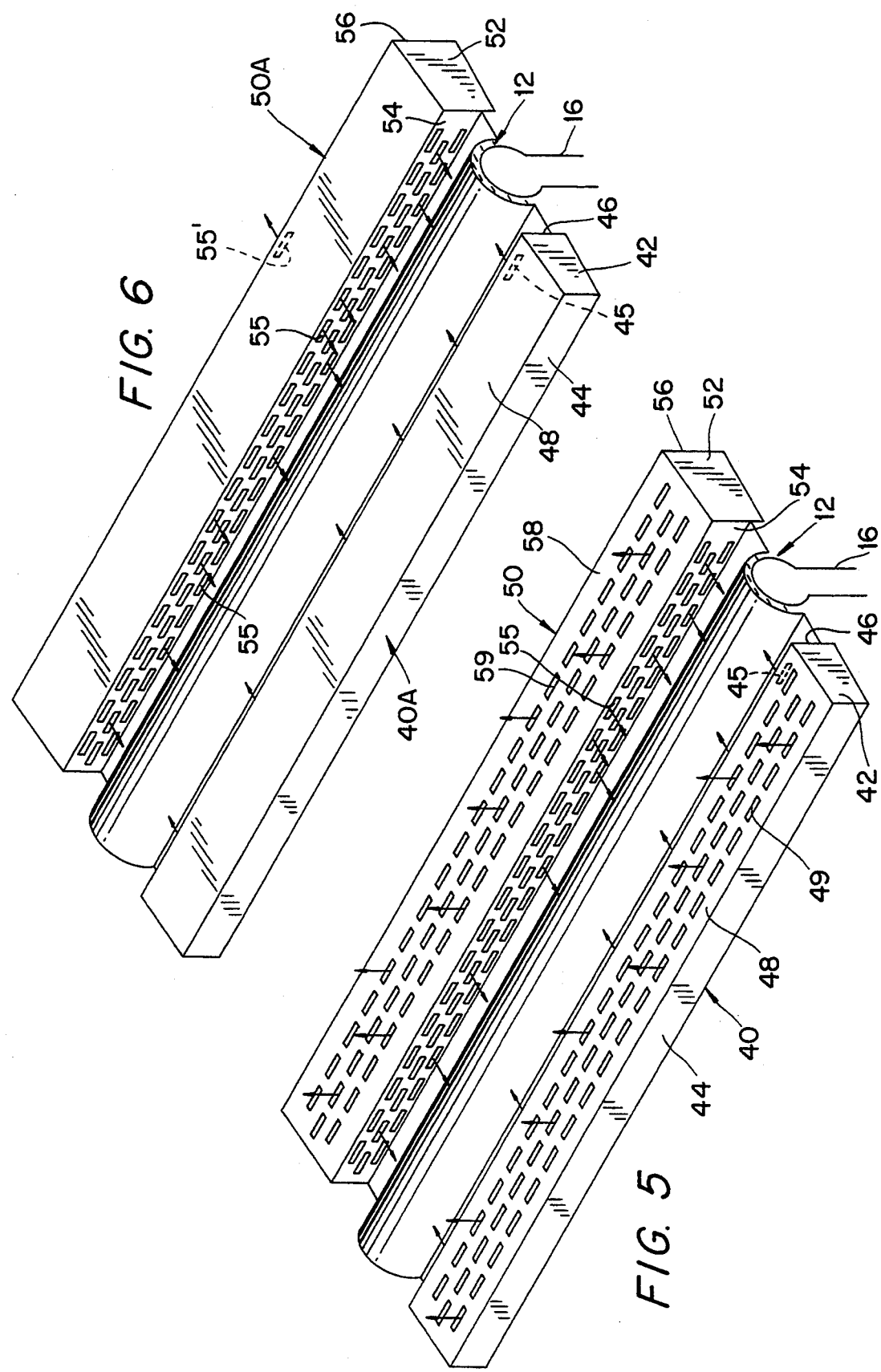

PROCESS AND APPARATUS FOR THE WAVE SOLDERING OF CIRCUIT BOARDS

BACKGROUND OF THE INVENTION

The present invention relates to methods and apparatus for providing a non-oxidizing atmosphere at the surface of a wave soldering bath to discourage the formation of oxides on the liquid solder surfaces.

Wave soldering machines have been introduced for a long time in the industry to automatically solder components on a printed circuit board which operation was previously done by hand. A usual wave soldering machine comprises at least one preheating zone to preheat the printed circuit board, at least one soldering zone to solder the components to the board by coating the bottom side of the printed circuit board with molten solder contained in a solder pot, and at least one cooling zone where the solder is solidified. This soldering process, or coating process, is usually conducted in the presence of a fluxing agent which agent is used to improve the wetting of the copper surface on the bottom of the printed circuit board which surface needs to be joined or coated. The fluxing agents are usually corrosive and the excess or residue of these agents must be cleaned after the wave soldering operation.

Low residue no-clean fluxes or flux-less processes have been developed wherein it is possible to carry out the wave soldering process without the inconvenience of standard fluxing agents, under a substantially oxygen-free atmosphere, such as nitrogen.

U.S. Pat. No. 3,705,457 discloses one of the earliest wave soldering processes, including injection of an inert gas to avoid oxidation of the metallic surfaces of the printed circuit board.

U.S. Pat. No. 4,538,757 discloses a wave soldering process under a reducing atmosphere comprising nitrogen and hydrogen, and nitrogen curtains at entrance and exit of the machine to inhibit atmosphere exchange with the ambient air.

U.S. Pat. No. 4,606,493 discloses a method and apparatus for soldering printed circuit boards under an inert gas atmosphere to prevent oxidation of the electrical (usually copper) connections due to the heat produced during soldering and reduce the occurrence of thermal stress defects in the circuit carrier. To this end, an inert gas is injected through slits to provide a plurality of jets of high velocity which impinge the bottom side of the printed circuit board. As a condition of operation, the temperature of the inert gas jets is about twice as high as the temperature of the molten solder in the solder pot (600° C.).

U.S. Pat. No. 4,646,958 discloses a solder reflow, or solder chip process which is carried out in a flux-less or flux free system, under an atmosphere comprising nitrogen and saline, or hydrogen and saline.

U.S. Pat. No. 4,821,947 discloses a process to coat a molten metal to a metal-comprising surface without using a flux. This process is carried out in an inert atmosphere in which the temperature is sufficiently low that no damage is done to the metal-comprising surface, and no damage is done to materials such as components adjacent to the metal-comprising surface.

U.S. Pat. No. 5,071,058 discloses a process for conducting a joining/coating operation which is carried out in a controlled oxidizing atmosphere, having an oxidation capability greater than that required to oxidize a metal-comprising filler material used for joining or coating, but having less oxidation capability than that of air. In case of a wave soldering process the oxygen content in the inert gas atmosphere is at least 10 ppm and preferably at least 500 ppm.

U.S. Pat. No. 5,121,875 discloses a short hood for wave soldering machines, wherein preheating of the printed circuit boards is carried out under air. In this process a no-clean flux is used and an oxygen concentration which is less than 5% is recommended at the solder pot.

U.S. Pat. No. 4,921,156 discloses an apparatus having a soldering chamber and comprising means to inject a protective gaseous atmosphere in the soldering chamber and sealing skirt means protruding downwardly into the pool of molten metal solder. Preferably the protective gaseous atmosphere is comprised of nitrogen and possibly of some reducing agent.

U.S. Pat. No. 4,746,289 discloses a process for treating parts under a non-reactive atmosphere with laminar flow conditions. The laminar flow conditions disclosed in this patent usually apply for inert gas injection in wave soldering machines.

In sum, a substantially oxygen-free atmosphere has been achieved by a so-called fully inerted wave soldering system, and a dross reduction boundary system.

The fully inerted wave soldering systems currently uses a tunnel type of system. That type of system is very expensive and time-consuming to install. Because this type of machine uses a tunnel, the access to the assemblies being soldered is greatly reduced. To achieve the desired results that type of system must operate at very high gas flow rates (over 1500 scfh). By doing this, the oxygen ppm level in the inerting system is kept low, thus yielding the desired results. If the flow rate is reduced, the atmosphere becomes unstable and benefits are lost. The primary goal of the fully inerted system is keep the oxygen ppm level below approximately 100 ppm. This then would yield the maximum dross reduction with the greater wettability for soldering.

The dross reduction boundary inerting system was developed to address the problems of the fully inerted system. The design was such that it can be easily installed and is much lower in cost. The other goal of this system was to have a reduced inerting gas flow rate. While those goals appear to have been met, the performance of that system is greatly reduced as compared to that of the fully inerted system. Because the boundary inerting system depends on a circuit board being present for the inerting to take place, the actual inerting effect is never fully achieved. The dross reduction of such a system is typically at best 70% (with reference to a solder pot operating without an inerting gas) with only marginal if any improvements in wettability.

Examples of a dross reduction boundary inerting system can be found in U.S. Pat. Nos. 5,203,489 and 5,240,169. There is disclosed therein a system in which solder waves are established by wave pumps in a solder reservoir. A conveyor transports circuit boards so that their undersides pass through the solder waves. As depicted in FIG. 10, a cover plate C extends across the top of the reservoir R and includes recesses to accommodate the solder waves. On the sides of each solder wave there is thus formed a chamber CH bordered on its top by the cover, on its bottom by the solder reservoir, one side by the solder wave, and on an opposite side by either (i) a stationary wall (of the solder pot or solder pot housing), or (ii) another solder wave (in the case where the chamber is situated between two solder waves). Each chamber includes a gas outlet defined by a gap G formed between the solder wave SW and an edge of the cover slot.

Disposed within each chamber is a gas discharge pipe P extending parallel to the length of the solder wave. A shield gas is discharged from orifices in the gas discharge pipe to create an inert atmosphere within the chamber CH. A flow F of shield gas exits the chamber through the outlet. That gas flow is intended to provide an inert blanket across the portion of the wave side which projects above the gap G when a circuit board is present. However, when no circuit board is present, the portion TS of the top surface of the wave which curves away from the gap G is exposed to any ambient oxygen which may be present in the ambient atmosphere, whereupon dross can be formed. In the case of soldering operations in which there occurs a wide spacial gap between successive circuit boards being conveyed to the solder pot, it is not unusual for the solder wave pumps to be deactivated between the soldering of successive boards in order to minimize dross formation.

Furthermore, the behavior of the gas flow F emerging from the chamber can actually promote the formation of dross on the solder wave. In that regard, the pressure difference between the gas in the discharge pipe on the one hand and the atmosphere disposed above the chamber outlet, on the other hand, is relatively low. As a result, the velocity of the gas traveling within the chamber toward the outlet is relatively slow. Due to its slow travel, the gas will be significantly heated by the hot solder wave. Consequently, the hot gas flow F emerging from the gap G has a tendency to rapidly rise and create a free swirling convection current CC which draws the cooler atmosphere (and any oxygen contained therein) downwardly toward the solder wave, thus resulting in the formation of dross.

Another region in which dross is formed in the solder is at the place where the drive shafts for the wave pumps enter the solder reservoir. The rotation of those shafts produces a churning of the solder, whereby oxidation is promoted.

It will be appreciated that the dross formed in the solder eventually builds up to a level requiring that the solder pot be shut-down to enable the dross to be skimmed off the top of the solder reservoir. The frequency at which those costly shut-downs occur is a function of the rate of dross formation.

Therefore, it would be desirable to minimize the rate of dross formation beyond the rates currently achieved.

SUMMARY OF THE INVENTION

The present invention relates to process and apparatus aspects relating to the wave soldering of a member such as a circuit board. The process involves emitting a solder wave upwardly from a solder nozzle, and passing the member along a path so that at least an underside of the member passes through the solder wave. Shield gas is provided within first and second gas plenums disposed upstream and downstream, respectively, of the solder wave as defined with reference to the direction of travel of the member. Each gas plenum includes a side wall disposed opposite the solder wave, with orifice means formed in the side wall. The shield gas is pressurized within each plenum so that the shield gas exits the orifice means for travel toward the solder wave at a velocity in the range of 1–30 m/s.

In another aspect of the process, shield gas is introduced into each plenum by conducting the shield gas along a delivery conduit extending longitudinally within the plenum. The gas is discharged along the longitudinal length of the delivery conduit. The shield gas is conducted outwardly from each plenum through the orifice means such that the velocity of the shield gas is substantially increased and is directed toward the solder wave.

In still another aspect of the process, the plenum side wall faces the solder wave, with vertically spaced orifice means in the side wall. Each plenum is arranged such that an upper portion of the side wall is spaced horizontally from the solder wave to form a gap therebetween, with an upper portion of the top surface of the solder wave being disposed above, and curving away from, the gap. Pressurized shield gas is provided within the plenums such that the shield gas is ejected from the orifice means for travel toward the solder wave, with at least an upper portion of the ejected gas being directed toward and across the portion of the top surface of the solder wave which curves away from the gap.

In still another aspect of the process, the shield gas may be ejected from a top wall of the plenum instead of, or in addition to, the discharging of shield gas from a side wall. Such upwardly discharged shield gas impinges against the underside of the member to strip and train the air from such underside.

An apparatus aspect of the invention comprises a solder reservoir, a solder nozzle disposed in the solder reservoir, a pump for ejecting an upward solder wave from the solder nozzle, and a conveyor for conveying the member such that an underside thereof passes through the solder wave.

First and second gas plenums are disposed adjacent upstream and downstream sides, respectively, of the solder wave, as defined with reference to a direction of travel of the conveying means. Means is provided for delivering pressurized shield gas into each plenum. Each plenum includes a side portion opposing a solder wave. Each side portion has orifice means for discharging the pressurized shield gas toward the solder wave. The orifice means is dimensioned so that pressurized shield gas is discharged through the solder means toward the solder wave at a velocity in the range of 1–30 m/s.

In another aspect of the apparatus, a delivery conduit may extend longitudinally within each plenum for introducing shield gas into the plenum so that the plenum is pressurized with shield gas. The side wall includes orifice means arranged to eject the pressurized shield gas toward the solder wave and is dimensioned to produce a substantial increase in the velocity of the shield gas.

In yet another aspect of the apparatus, a side portion of the plenum disposed opposite the solder wave has vertically spaced orifices for discharging shield gas. An upper portion of the plenum is spaced from the respective solder wave to form a gap therebetween, with a portion of a top surface of the solder wave disposed above, and curving away from, the gap. Lower ones of the orifices are arranged to direct pressurized shield gas toward a portion of the solder wave situated below the gap. Upper ones of the orifices are arranged to direct pressurized shield gas toward and across a portion of the top surface of the solder wave curving away from the gap.

In still a further aspect of the apparatus, a top wall of the plenum may include orifice means instead of, or in addition to, the orifice means provided in a side wall. Shield gas discharged upwardly from the orifice means in the top wall impinges against the underside of a member to strip entrained air therefrom.

In yet another aspect of the apparatus, the conveyor which conveys the member, is adjustable to vary the conveyor width and accommodate members of different widths. An enclosure overlying the solder reservoir includes an inlet and an outlet for a member being conveyed. An atmosphere of shield gas is established within the enclosure. A curtain extends horizontally across at least one of the inlet and outlet ends to cover a portion thereof not occupied by the conveyor. One end of the curtain is connected to the adjustable portion of the conveyor for movement therewith when the conveyor width is adjusted.

In still another aspect of the apparatus, a motor-driven shaft extends downwardly into the solder reservoir for operating the pump. A stationary hollow sleeve extends downwardly below the solder surface, with the shaft extending through the sleeve, in order to restrict churning of solder to a region within the sleeve. Pressurized shield gas is conducted into the sleeve to inert the solder being churned therein.

Another aspect of the apparatus involves an inerting assembly adapted for use in a wave soldering apparatus to provide an inerting atmosphere. The assembly comprises a plenum having a top wall and two downwardly depending side walls extending between opposite longitudinal ends of the plenum. At least one of the side walls includes orifice means formed therein. A gas delivery conduit extends longitudinally within the plenum for introducing shield gas into the plenum.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 5 is a top perspective view of a first embodiment of a gas plenum assembly according to the present invention;

FIG. 6 is a view similar to FIG. 4 of a second embodiment of a gas plenum assembly according to the present invention;

DETAILED DESCRIPTION OF PREFERRED EMBODIMENTS OF THE INVENTION

Figure 1:
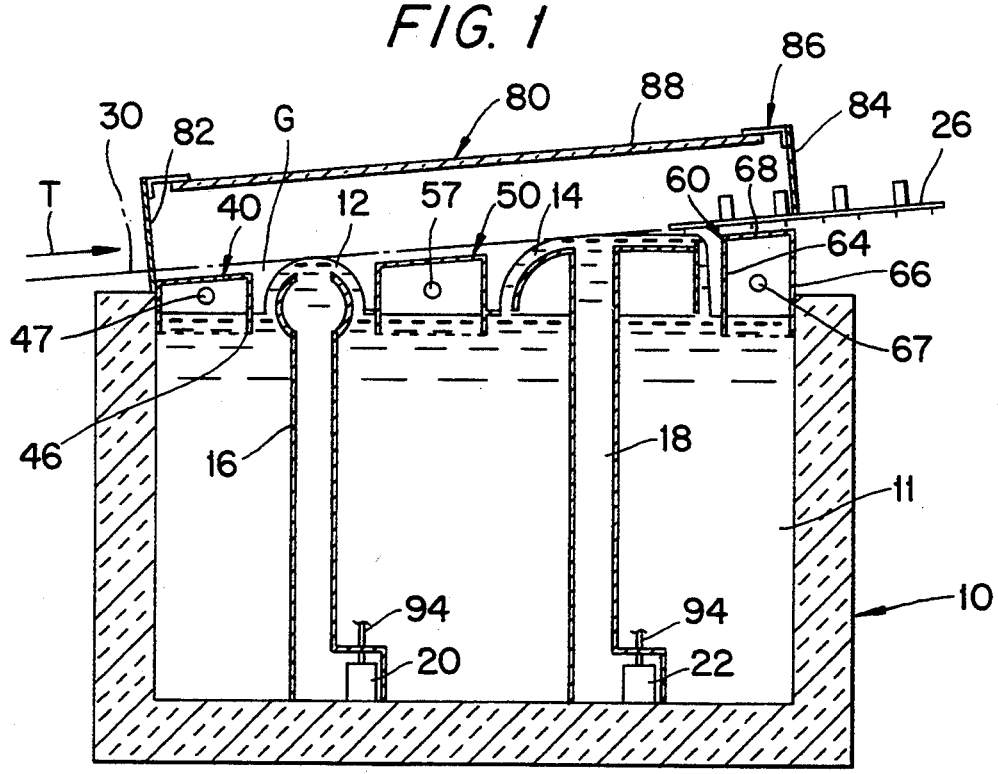
FIG. 1 is a vertical sectional view taken through a solder pot as a circuit board is being passed therethrough, in accordance with the present invention.

Depicted in FIG. 1 is a solder pot 10 that contains a solder reservoir or bath 11 in which a pair of solder waves 12, 14 has been established by respective wave nozzles 16, 18 and adjustable pumps 20, 22 in a conventional manner. The wave 12 can be a turbulent wave, and the wave 14 can be a laminar wave, although the waves could exhibit any desired flow characteristics.

The wave 12 is disposed upstream of the wave 14, as defined with reference to the direction of travel T of circuit boards 26 that are conveyed by a conventional conveyor 30 such that at least the undersides of the circuit boards 26 pass sequentially through the solder waves 12, 14. The direction of travel T is inclined upwardly at an angle to horizontal, although it could be horizontal if desired.

A shield gas system is provided for resisting the oxidation of the solder in the reservoir. That system comprises a plurality of gas plenums 40, 50, 60. The first gas plenum 40 is located upstream of the first wave 12 (as defined with reference to the direction of conveyance of the circuit boards); the second gas plenum 50 is located between the waves 12, 14; the third gas plenum 60 is located downstream of the second wave 14. Each plenum is spaced from a respective solder wave to form a horizontal gap G therebetween.

Figure 4:
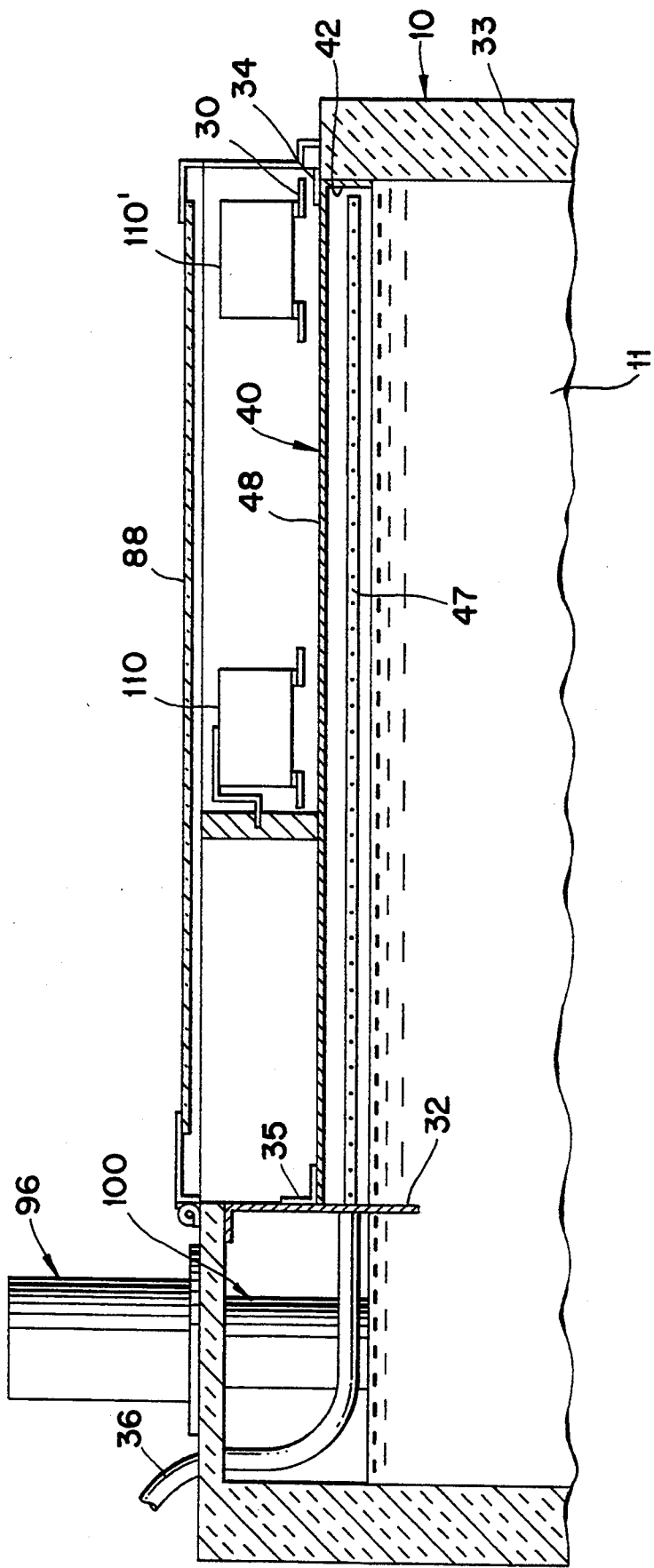
FIG. 4 is a view similar to FIG. 3 with the vertical plane passing through one of the pressurized gas plenums.

Each gas plenum includes three upstanding walls, namely, one vertical end wall, two vertical side walls, and a top wall. For example, shown in FIG. 5 are first and second ones of the gas plenums 40, 50. The first plenum 40 includes a vertical end wall 42, two vertical side walls 44, 46, and a top wall 48. Likewise, the second gas plenum 42 includes one end wall 52, two side walls 54, 56, and a top wall 58. Depicted in FIG. 1 are the side walls 64, 66 and top wall 68 of the third gas plenum 60. The plenums 40, 50, 60 are open at their bottom sides so that each plenum is partially immersed in the solder, and the floor of the plenum chamber is defined by the surface of the solder. Also, the end of the plenum 40 disposed opposite the end wall 42 is open (see FIG. 4) and placed sealingly against a fixed vertical wall 32 disposed within the reservoir. One end of the plenum 40 is attached to a wall 33 of the solder pot by means of a bracket 34, and the other end is attached to the wall 32 by a bracket 35.

Instead of being open at the bottom, the plenum could have a bottom wall closing off the bottom of the plenum. Such a bottom wall would be connected to the side walls and end wall and extend parallel to the top wall.

Similar brackets (not shown) are provided for attaching the other plenums 50, 60 to the walls 32, 34. Extending longitudinally within the plenum 40 is a gas delivery pipe 47. That pipe 47 is fastened to the wall 32 and is connected to a gas supply hose 36, the latter being connected to a source of pressurized shield gas, such as for example nitrogen, argon, carbon dioxide, helium, neon or any mixture thereof. The delivery pipe 47 includes suitable outlets for enabling the shield gas to be discharged generally uniformly along the length of the plenum.

Each of the other plenums 50 and 60 is provided with its own gas delivery pipe 57, 67, respectively, functioning in a manner similar to the pipe 47.

Each of the gas plenums has longitudinally spaced gas discharge orifices for discharging the gas. The first gas plenum 40 includes orifices 45 formed in its side wall 46 facing the first wave 12; the second gas plenum 50 has gas orifices 55 formed in its side wall 54 facing the first wave 12, and orifices 55' in its side wall 56 facing the second wave 14; the third gas plenum 60 has orifices 65 in its side wall 64 facing the second wave 14. Those orifices result in a uniform distribution of gas along the length of the wave.

The discharge orifices 45, 55, 55' 65 are shown as comprising horizontally elongated slits arranged as vertically spaced rows of horizontally spaced slits, but they can assume any other desired configuration. Importantly, the area of the discharge orifices of each gas plenum is designed in conjunction with the magnitude of the gas flow provided to each plenum by the respective delivery pipe 47, 57, 67 to create a pressure in the range of 0.01–50.0 inches of water in each plenum, and such that the shield gas discharged therefrom in laminar streams having a high velocity in the range of 1–30 m/s, more preferably 3–8 m/s.

Figure 8:
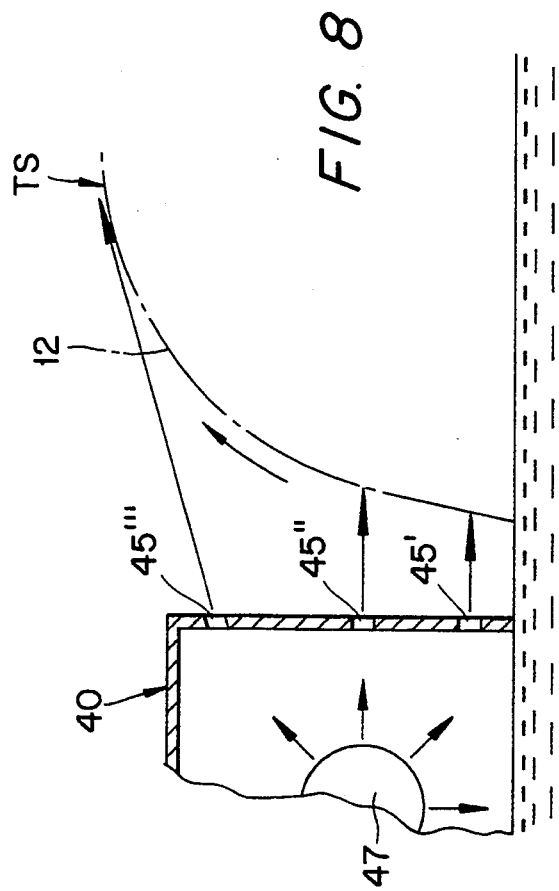
FIG. 8 is a fragmentary schematic view showing the direction of gas flow from a pressurized gas plenum according to the present invention.
Figure 9:
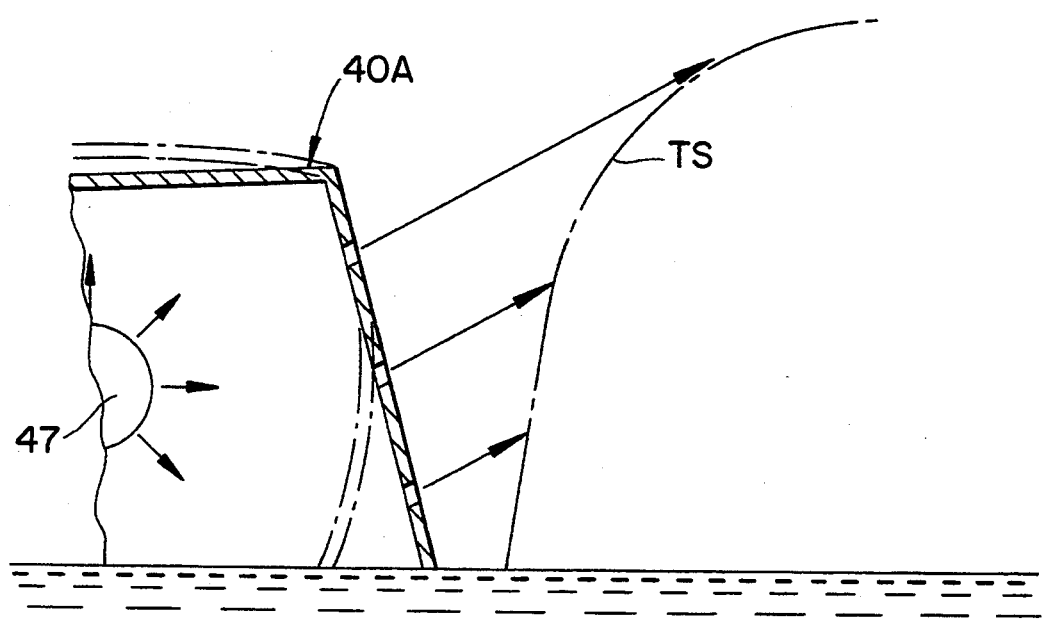
FIG. 9 is a view similar to FIG. 8 of a modified plenum.

Furthermore, as shown in FIG. 8 the gas discharge orifices of the plenum are arranged to direct the high velocity shield gas toward the respective solder wave from the bottom to the top thereof. Thus, the lowermost row of slits 45' directs gas toward a lower portion of the wave (either horizontally or at an angle relative to horizontal (see FIG. 9)); the middle row of slits 45" directs gas toward an intermediate portion of the wave; and the uppermost row 45 . . . of slits directs gas toward an upper portion of the wave.

Figure 10:
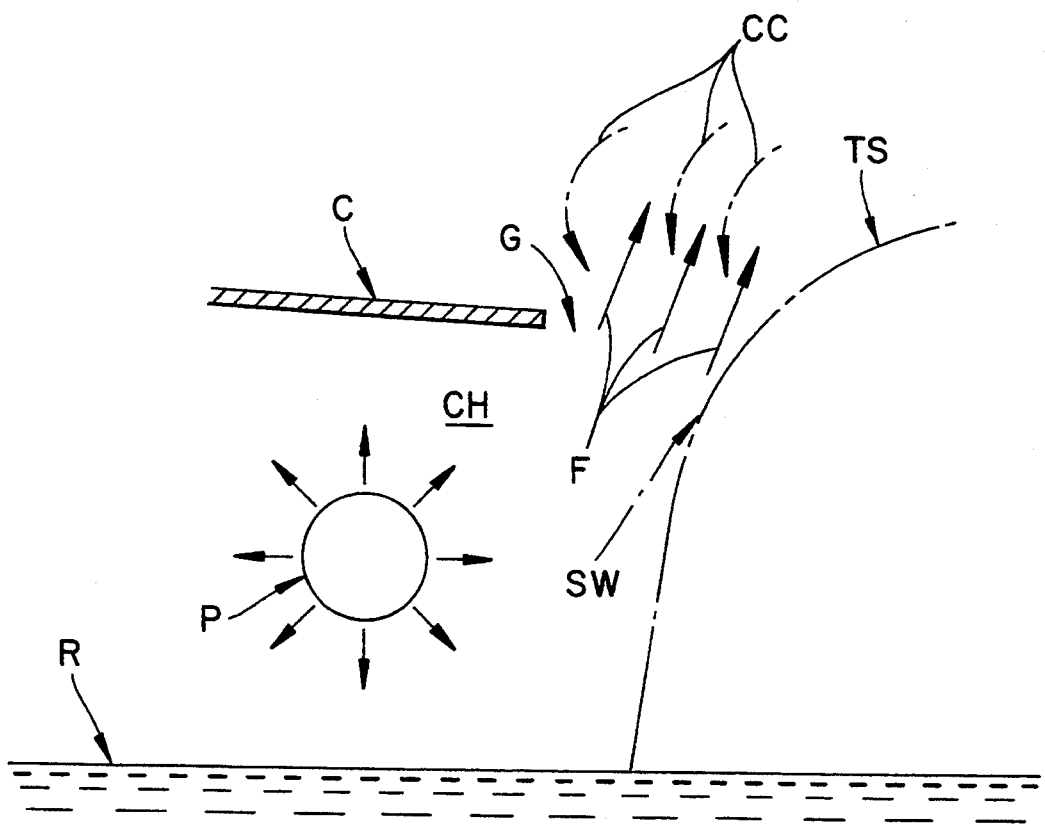
FIG. 10 is a view similar to FIG. 8 of a prior art arrangement.

In particular, the gas from the uppermost row of slits 45 . . . is directed toward and across the portion of the top surface TS of the wave located above, and curving away from, the gap G, as shown in FIG. 8. As a result, high velocity gas emerging upwardly from the gap G is deflected to travel across the top of that portion TS of the wave top surface. The high velocity of the deflected gas provides the gas with a relatively high momentum which resists being displaced away from the wave by thermally generated forces emanating from the wave. Thus, even when there is no circuit board passing through the wave, a substantial portion (if not all) of the top surface of the wave will be blanketed by the gas, which tends to follow the contour of the wave for a substantial distance. This will not occur in the case of slow-moving gas which is not caused to be deflected, as shown in FIG. 10.

Furthermore, the high velocity of the gas according to the present invention minimizes the contact time between the gas and hot solder wave, so the gas exiting the gap G is relatively cool. That means that there will be less of a tendency for a swirling air current to be established above the gap which could draw cooler atmosphere (and possibly air) down toward the wave as compared to slower moving air which is significantly heated by the wave as previously described in connection with FIG. 10.

In addition, by discharging gas at high velocity from the slits, the slits will be less likely to become clogged by solder which may tend to splash toward the plenum. That would not be the case if the gas were to exit at such a slow speed that it could not effectively push away the solder.

It will be appreciated that the side walls 46, 54, 56, 64 need not be flat or perfectly vertical. Instead, they could be curved in any direction (e.g., see the broken lines in FIG. 9) and/or angled relative to vertical (see the solid lines in FIG. 9). It is only necessary that they be located generally opposite the respective solder wave so that gas streams emitted therefrom can contact the wave.

The top walls of one or all of the gas plenums can also be provided with gas discharge orifices. In that regard, attention is directed to FIG. 5 depicting the first and second gas plenums 40, 50 having gas discharge orifices 49, 59 in their respective side and top walls. Gas discharged upwardly from those orifices 49, 59 bears against the undersides of the circuit boards to strip therefrom oxygen-containing air which may be entrained by the circuit boards. The total area of those orifices is designed to provide a gas velocity in the range of 1–30 m/s, more preferably 3–8 m/s. Such a gas velocity is able to strip entrained air, without disrupting any solder (in the case of the second and third plenums 50, 60). The top walls need not be flat, but can have other shapes, including a curved shape as shown in broken lines in FIG. 9.

Figure 2:
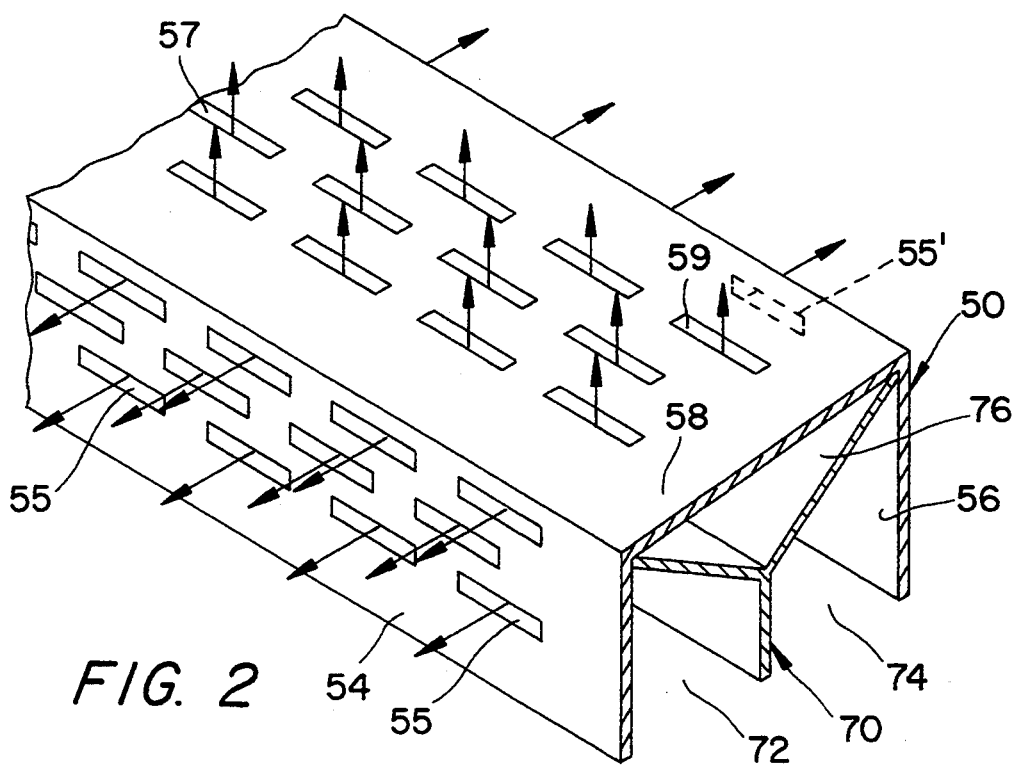
FIG. 2 is a fragmentary perspective view of a gas plenum according to one embodiment of the present invention.

In the event that a gas plenum is provided with discharge orifices in more than one wall thereof, it may be desirable to independently control the velocity of gas discharged from each wall. This can be accomplished by providing a divider within the plenum to segregate the gases discharged from the respective walls. For example, attention is directed to FIG. 2 depicting a divider 70 disposed within the second plenum 50. That divider creates three chambers 72, 74, 76 which are fed by three respective gas delivery pipes (not shown). The gases discharged through the respective discharge openings 55, 55', 59 can thus have their velocities independently controlled. In similar fashion, either or both of the first and third gas plenums 40, 60 could be provided with a divider which divides the plenum into two chambers for independent control.

Figure 7:
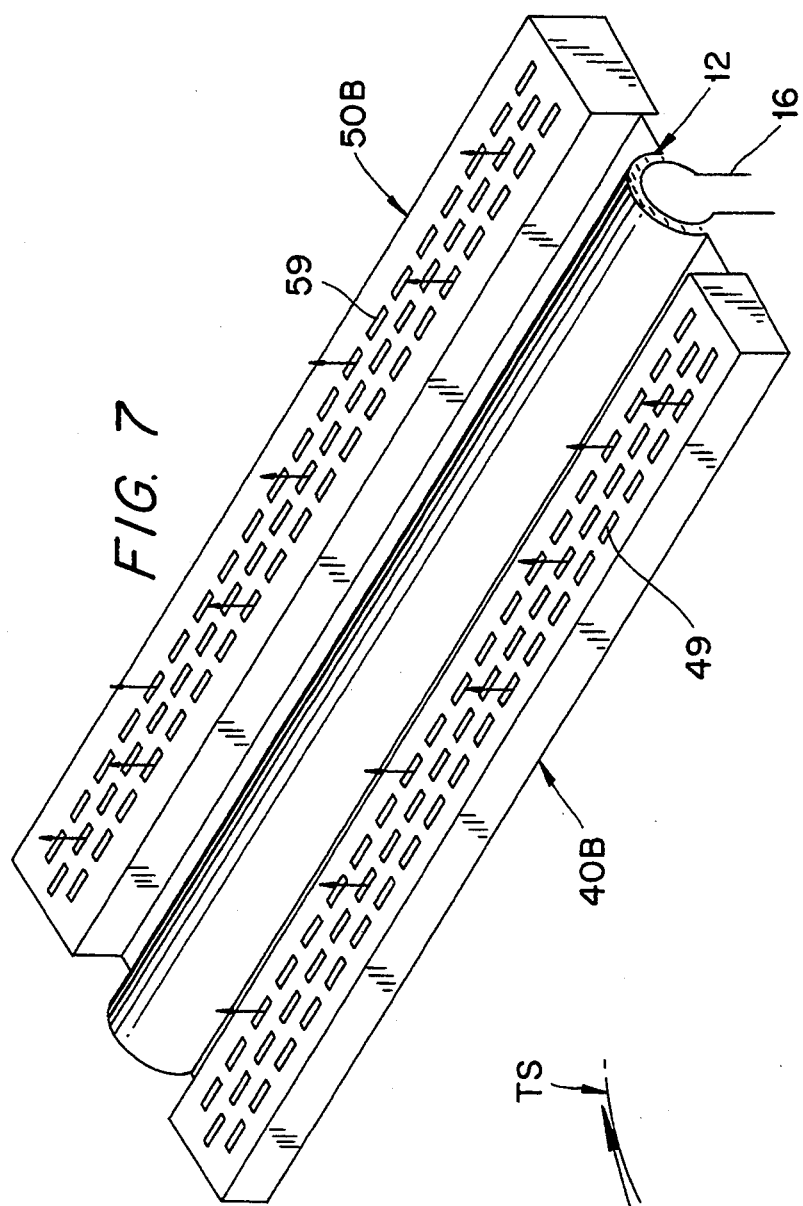
FIG. 7 is a view similar to FIG. 4 of a third embodiment of a gas plenum assembly according to the present invention.

If desired, shield gas can be discharged solely through the side walls, as depicted in FIG. 6, or solely through the top walls, as depicted in FIG. 7. In FIG. 6, gas discharge openings 45, 55, 55' are formed solely in the side walls of the gas plenums 40A, 50A. In FIG. 7, discharge openings 47, 59 are formed solely in the top walls of the gas plenums 40B, 50B.

It is preferred that an enclosure 80 be arranged over the solder reservoir, with inlet and outlet curtains 82, 84 being positioned over inlet and outlet ends of the enclosure. In that way, the shield gas can be better retained in the vicinity of the solder waves 12, 14. The curtains can comprise vertical strips of flexible material arranged in horizontally overlapping relationship. The strips would be attached only at their upper ends to enable the conveyor and circuit boards to push them aside. The enclosure preferably has a cover 86 which includes a transparent middle section 88 preferably formed of glass to permit the soldering operation to be observed. The cover 80 can be hinged at 90 (see FIG. 3) to permit the cover to be raised if desired.

Figure 3:
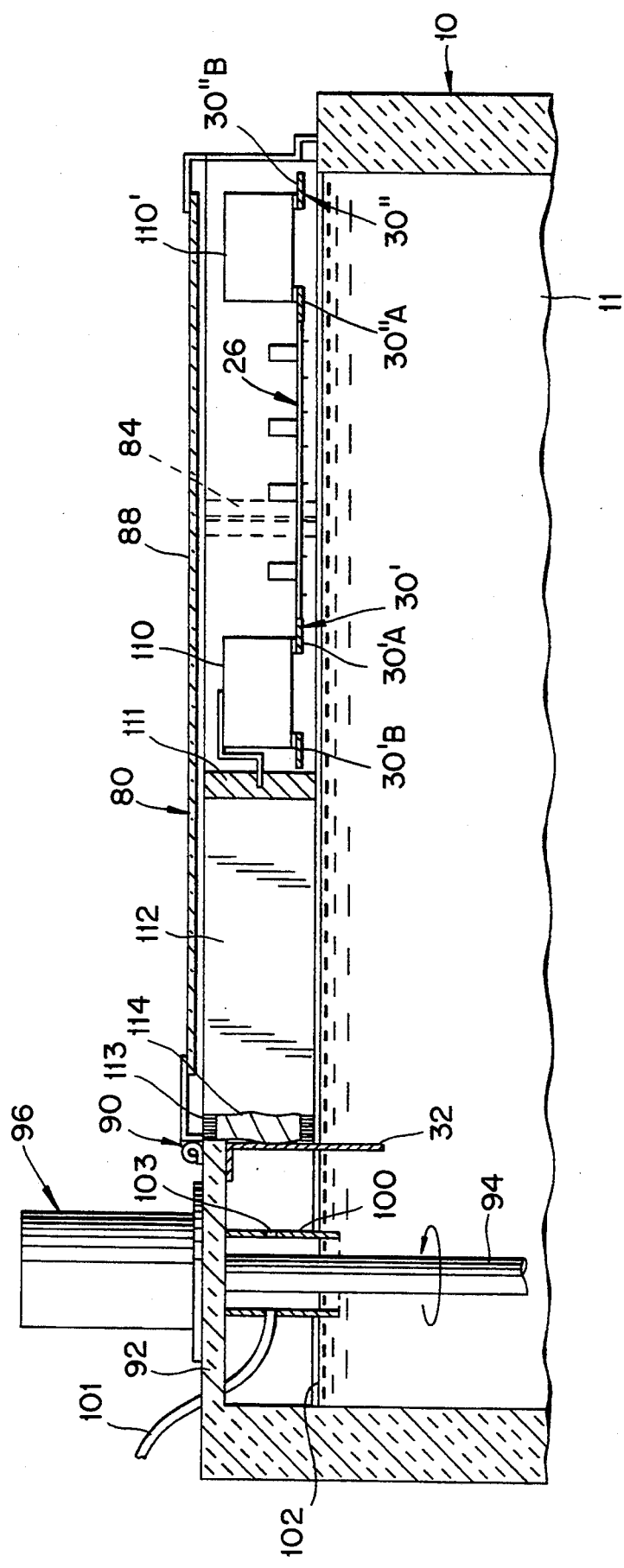
FIG. 3 is a vertical sectional view taken through the solder pot along a vertical plane oriented perpendicular to a direction of movement of circuit boards and passing through a drive shaft of a wave pump.

The cover 80 is hinged to a section 92 of the solder reservoir through which pump drive shafts 94 extend (see FIG. 3). Each pump drive shaft 94 is driven by a respective motor 96. In order to inert the area of the solder which is churned by the rotating action of the drive shafts 94, there is provided a stationary hollow sleeve 100 for each drive shaft. That sleeve 100 is of cylindrical configuration and extends downwardly below the upper level 102 of solder in the reservoir. Each drive shaft 94 extends through its respective sleeve 100. A shield gas under pressure is fed to the interior of the sleeve 100 by a supply hose 101, and the gas exits the sleeve 100 through a hole 103 formed in the sleeve. Hence, the only portion of the solder reservoir which is churned by the rotating drive shaft 94 is disposed within the sleeve and is inerted by the shield gas which is maintained under pressure within the sleeve 100.

The conveyor 30 for the circuit boards 26 travels on conventional carriers 110, 110' (see FIG. 3). That is, the conveyor comprises a pair of endlessly rotating chains 30', 30". The chain 30' includes a flight 30'A traveling into the plane of the paper in FIG. 3 (i.e., traveling away from the observer), and a flight 30'B traveling out of the paper (toward the observer). Likewise, the conveyor chain 30" includes flights 30"A, 30"B traveling into and out of the paper, respectively. That conveyor arrangement is conventional. The carrier 110 is mounted to a wall 111 which is horizontally adjustable toward and away from the other carrier 110' in a conventional manner (not shown) to vary the spacing between the conveyor chains 30', 30" in order to accommodate circuit boards 26 of different widths. The carrier 110 is connected to a horizontal curtain 112 which is separate from the aforementioned curtains 82, 84 and is provided to overlie the portion of the inlet and/or outlet not occupied by the conveyor 30. One end of the curtain 112 is mounted to a vertical roller 114 which is biased in rotation by coil torsion springs 113. The other end of the curtain is connected to the carrier 110. When the carrier 110 is horizontally adjusted in order to vary the conveyor width, the curtain 112 is automatically rolled (or unrolled). The curtain 112 can be disposed at the inlet and/or outlet of the enclosure.

Instead of employing a curtain 113 which rolls up, a collapsible curtain, e.g., a bellows-like member, could be employed which expands and contracts in an accordion-like manner when the carrier 110 is adjusted.

In operation, circuit boards 26 are conveyed by the conveyor 30 to the solder reservoir. The circuit boards may have been pre-treated with a flux and heated, in a conventional manner. As the circuit boards travel past the inlet curtain 82 and enter the enclosure 80, shield gas discharged upwardly from the top slits 49 of the first pressurized gas plenum 40 impinges against the underside of the circuit board to strip away entrained air as the board passes that gas flow. After passing the first pressurized gas plenum, the underside of the circuit board travels through the first solder wave 12 and is coated with solder in the customary manner. Then, the underside of the circuit board sequentially travels across: (i) an air-stripping flow of shield gas discharged from the top slits 59 of the second pressurized gas plenum 50, (ii) the second solder wave 14, and (iii) an air-stripping flow of shield gas discharged from top slits 55 of the third pressurized gas plenum 60. The speed of the air-stripping gas flowing from the top slits of the second and third pressurized gas plenums 50, 60 is not great enough to disturb or remove solder from the undersides of the circuit boards.

The formation of dross in the solder is minimized by the effective measures taken to keep air away from the solder. That is, the air-stripping flows of shield gas discharged from the top slits of the gas plenums 40, 50, 60 minimize the concentration of oxygen traveling in the vicinity of the solder. There is thus achieved a shielding atmosphere which is retained by the enclosure 80.

Furthermore, the surfaces of the solder waves are amply protected by shield gas ejected from the side slits 55 (and 55') of the three pressurized gas plenums. Those gas flows are discharged at relatively high speed from the pressurized plenums, and are deflected by at least an upper gas flow from the plenum so as to travel across and in contact with the portion TS of the top surface of the wave which curves away from the gap G. That gas produces an effective inerting of the wave surface TS even in the absence of a circuit board.

The high velocity of the gas traveling toward the gap G results in the gas emerging from the slot G being cooler than in the case of slow-moving gas. Hence, there is less of a tendency for circular convection currents to be established which can pull oxygen-containing atmosphere down toward the wave.

AS an example, a plenum operated in accordance with the present invention employed orifices in a side wall representing about one percent of the surface area of the side wall. A flow of 100 scfh was established in the plenum to produce about 0.06 in/water of pressure, and a gas velocity at the orifices of about 6 m/s. For a flow of 300 scfh, a pressure of about 0.5 inches of water and gas velocity of about 18 m/s was established.

This can be compared to values calculated for similar flows of an inerting system according to FIG. 10, wherein for a flow of 100 scfh a pressure of 0.0001 inches of water was calculated that would give a gas velocity at the gap of about 0.24 m/s. At a 300 scfh flow rate, the pressure was calculated to be 0.0008 inches of water and the gas velocity at the gap about 0.72 m/s. It will be appreciated that in the FIG. 10 structure, the gas velocity increases as the gas approaches the gap (which defines a restriction). Thus, the gas flow within the chamber CH of FIG. 10 would be even lower than the 0.24 m/s and 0.72 m/s values. Those values can be compared, respectively, to the velocities of about 6 m/s and 18 m/s achievable in connection with the presently claimed invention.

The relatively high pressure of shield gas within the gas plenums serves to expel any oxygen therefrom.

The solder which is churned by the rotating drive shafts 94 of the wave pumps will not be oxidized, because it is blanketed by pressurized shield gas within the sleeves 100.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A process of wave soldering a member comprising the steps of:
   A) emitting a solder wave upwardly from a solder nozzle;
   B) passing the member along a path so that at least an underside of the member passes through the solder wave;
   C) providing shield gas within first and second gas plenums disposed upstream and downstream, respectively, of the solder wave as defined with reference to the direction of travel of the member, each gas plenum including a side wall disposed opposite the solder wave, with orifice means formed in the side wall; and D) pressurizing the shield gas within each plenum so that the shield gas exits the orifice means for travel toward the solder wave at a velocity in the range of 1–30 m/s.

2. A process according to claim 1, wherein the side wall extends in a horizontal direction from one end to another of the respective gas plenum, step C comprising conducting pressurized shield gas along a gas delivery conduit extending longitudinally within the plenum and discharging the shield gas into the plenum from locations along the delivery conduit.

3. A process according to claim 2, wherein an upper portion of each plenum is spaced from a respective solder wave to form a gap therebetween, an upper portion of the top surface of the solder wave being disposed above and curving away from, the gap, step D including directing at least an upper portion of the gas exiting the orifice means toward and across the portion of the top surface of the solder wave which curves away from the gap.

4. A process according to claim 2, wherein step C comprises conducting pressurized shield gas along a gas delivery conduit spaced inwardly from the side wall of the respective plenum.

5. A process according to claim 1, wherein the side wall extends in a longitudinal direction from one end to another of the respective plenum, step D comprising causing the shield gas to exit longitudinally spaced orifices formed in the side wall.

6. A process according to claim 1, wherein the side wall extends in a longitudinal direction from one end to another of the respective plenum, step D comprising causing the shield gas to exit vertically spaced orifices formed in the side wall.

7. A process according to claim 6, wherein step D comprises causing the shield gas to exit orifices which are spaced apart vertically and longitudinally.

8. A process according to claim 1, wherein the orifice means constitutes first orifice means, and further comprising the step of discharging shield gas from second orifice means formed in a top wall of at least one of the gas plenums which opposes the underside of the member to remove entrained air from that underside.

9. A process according to claim 8, wherein shield gas is discharged from the second orifice means of both of the gas plenums.

10. A process according to claim 1, wherein the solder wave constitutes a first solder wave, and further comprising the steps of emitting upwardly a second solder wave at a location downstream of the first solder wave, as defined with reference to the direction of travel of the member, such that the second gas plenum is situated between the first and second solder waves, discharging pressurized shield gas from orifice means of a side wall of the second gas plenum so that such discharged shield gas travels toward the second solder wave at a velocity in the range of 1–30 m/s, pressurizing shield gas within a third gas plenum disposed downstream of the second solder wave, and discharging shield gas from orifice means formed in a side wall of the third gas plenum so that such discharged shield gas travels toward the second solder wave at a velocity in the range of 1–30 m/s.

11. A process according to claim 10 further including discharging shield gas from orifice means formed in a top wall of the third gas plenum so that the discharged gas strips entrained air from the underside of the member.

12. A process according to claim 10, wherein pressurized shield gas is discharged from orifice means formed in a top wall of each gas plenum.

13. A process according to claim 12 further including providing an enclosure over the solder wave for retaining shield gas, and passing the member through inlet and outlet portions of the enclosure.

14. A process according to claim 1, wherein the shield gas is discharged from the orifice means at a velocity in the range of 3–8 m/s.

15. A process according to claim 1, wherein step C includes providing shield gas within a plenum having at least one additional wall in addition to the side wall, the additional wall being provided with orifice means for emitting shield gas; and wherein step D further including the step of independently controlling the velocity of shield gas fed to the different orifice means.

16. A process according to claim 1, wherein the shield gas within the plenum is pressurized in the range of 0.01 to 50.0 inches of water.

17. A process of wave soldering a member comprising the steps of:
A) emitting an upward solder wave from a solder nozzle;
B) passing the member along a path of travel so that at least an underside of the member passes through the solder wave;
C) providing first and second gas plenums disposed upstream and downstream, respectively, of the solder wave as defined with reference to the direction of travel of the member, each plenum including a side wall facing the solder wave with vertically spaced orifice means formed in the side wall, each plenum arranged such that an upper portion of the side wall is spaced horizontally from the solder wave to form a gap therebetween, with an upper portion of the top surface of the solder wave being disposed above, and curving away from, the gap; and
D) providing pressurized shield gas within the plenums such that the shield gas is ejected from the orifice means for travel toward the solder wave, with at least an upper portion of the ejected gas being directed toward and across the portion of the top surface of the solder wave which curves away from the gap.

18. A process of wave soldering a member comprising the steps of:
A) emitting an upward solder wave from a solder nozzle in a solder reservoir, the solder wave being horizontally elongated;
B) passing the member along a path of travel so that at least an underside of the member passes through the solder wave;
C) providing gas plenums on opposite sides of the solder wave, each gas plenum extending horizontally parallel to the solder wave and having longitudinally spaced ends, each plenum including top and side walls extending longitudinally between the ends of the plenum, the side wall being disposed opposite the solder wave, the plenums being partially submerged in the solder reservoir;
D) introducing shield gas into each plenum by conducting the shield gas along a delivery conduit extending longitudinally within the plenum, the gas being discharged along the longitudinal length of the delivery conduit; and E) conducting the shield gas outwardly from each plenum through orifice means in the side wall such that the velocity of the shield gas is substantially increased and is directed toward the solder wave.

19. A process of wave soldering a member comprising the steps of:
   A) emitting an upward solder wave from a solder nozzle;
   B) passing the member along a path of travel so that at least an underside of the member passes through the solder wave;
   C) providing pressurized shield gas in a gas plenum disposed on one side of the solder wave, the gas plenum having a top wall disposed opposite the underside of a member traveling thereabove and including orifice means formed therein; and
   D) pressurizing the shield gas so that the shield gas is ejected through the orifice means and contacts the underside of the member for removing entrained air therefrom.

20. A process according to claim 19, wherein the top wall extends longitudinally from one to the other end of the plenum chamber, step C including feeding pressurized shield gas into the plenum along a longitudinally extending delivery conduit disposed within the plenum.

21. An apparatus for wave soldering a member, comprising:
   a solder reservoir;
   a solder nozzle disposed in the solder reservoir;
   a pump for ejecting an upward solder wave from the solder nozzle;
   a conveyor for conveying the member such that an underside thereof passes through the solder wave; and
   first and second gas plenums disposed adjacent upstream and downstream sides, respectively, of the solder wave as defined with reference to a direction of travel of the conveying means, means for delivering pressurized shield gas into each plenum, each plenum including a side portion opposing the solder wave, each side portion having orifice means for discharging the pressurized shield gas toward the solder wave, the orifice means being dimensioned so that pressurized shield gas is discharged through the orifice means toward the solder wave at a velocity in the range of 1-30 m/s.

22. Apparatus according to claim 21, wherein an upper portion of each plenum is spaced from the respective solder wave to form a gap therebetween, with a portion of a top surface of the solder wave disposed above, and curving away from the gap, lower ones of the orifices being arranged to direct pressurized shield gas toward a portion of the solder wave situated below the gap, upper ones of the orifices arranged to direct pressurized shield gas toward and across the portion of the top surface of the solder wave curving away from the gap.

23. Apparatus according to claim 21 further including a motor driven shaft extending downwardly into the solder reservoir and operably connected to the pump; and a stationary hollow sleeve extending below the solder surface with the shaft extending therethrough to restrict churning of the solder to a region within the sleeve.

24. Apparatus according to claim 23 further including means for conducting pressurized shield gas into the sleeve to inert the solder being churned therein.

25. Apparatus according to claim 23 further including an enclosure overlying the solder reservoir, the enclosure having inlet and outlet ends for enabling the conveyor to pass through the enclosure, a portion of the conveyor being adjustable to vary the conveyor width and accommodate members of different widths, a curtain extending horizontally across at least one of the inlet and outlet ends to cover a portion thereof not occupied by the conveyor, one end of the curtain being connected to the adjustable conveyor portion for movement therewith when the conveyor width is adjusted.

26. Apparatus according to claim 25, wherein the opposite end of the curtain is mounted on a biased roller to be rolled up or unrolled, depending upon the direction of movement of the end thereof connected to the adjustable conveyor portion.

27. Apparatus according to claim 21, wherein the plenum includes a plurality of walls, one of the walls defining the side portion, at least one other of the walls including orifice means for emitting shield gas; and means for independently controlling the velocity of gas fed to the different orifice means.

28. Apparatus according to claim 21, wherein each plenum is closed along its bottom.

29. An apparatus for wave soldering a member, comprising:
   a solder reservoir;
   a solder nozzle disposed in the solder reservoir;
   a pump for ejecting an upward solder wave from the solder nozzle;
   a conveyor for conveying the member such that an underside thereof passes through the solder wave; and
   first and second gas plenums disposed adjacent upstream and downstream sides, respectively, of the solder wave as defined with reference to a direction of travel of the conveying means, means for delivering pressurized shield gas into each plenum, each plenum including a side portion disposed opposite the solder wave, each such side portion having vertically spaced orifices for discharging shield gas, an upper portion of each plenum being spaced from the respective solder wave to form a gap therebetween, with a portion of a top surface of the solder wave disposed above, and curving away from, the gap, lower ones of the orifices being arranged to direct pressurized shield gas toward a portion of the solder wave situated below the gap, upper ones of the orifices being arranged to direct pressurized shield gas toward and across the portion of the top surface of the solder wave curving away from the gap.

30. An apparatus for wave soldering a member, comprising:
   a solder reservoir;
   a solder wave nozzle disposed in the solder reservoir;
   a pump for ejecting an upward solder wave from the solder wave nozzle;
   a conveyor for conveying the member along a direction of travel such that an underside thereof passes through the solder wave;
   first and second generally upwardly facing surfaces disposed beneath the conveyor on upstream and downstream sides, respectively, of the solder wave, as defined with reference to the direction of travel of the conveyor, the surfaces being spaced from the solder wave to form first and second gaps, respectively, therebetween, at least the first surface having orifice means therein defining gas discharge means for discharging a pressurized shield gas upwardly against the underside of a member to strip entrained air therefrom before the member reaches an area overlying the first gap.

31. Apparatus according to claim 30, wherein the second surface has orifice means therein defining gas discharge means for discharging shield gas upwardly against the underside of a member to strip entrained air therefrom.

32. Apparatus according to claim 30 further including an enclosure overlying the solder reservoir and including an inlet and outlet for the conveyor.

33. Apparatus according to claim 32 including another solder nozzle and pump for ejecting a second upward solder wave downstream of the first solder wave, there being a third generally horizontal surface located adjacent a downstream side of the second solder wave and adjacent the enclosure outlet, the third surface having orifice means therein defining gas discharge means for discharging shield gas upwardly against the underside of a member.

34. Apparatus according to claim 30, wherein the first and second surfaces are formed by the top walls of first and second gas plenums, respectively, each gas plenum including a side wall disposed opposite the solder wave, each side wall including orifice means dimensioned such that the pressurized shield gas within the respective plenum is ejected through the orifice means toward the solder wave at a velocity in the range of 1–30 m/s.

35. Apparatus according to claim 30 further including an enclosure overlying the solder reservoir, the enclosure having inlet and outlet ends for enabling the conveyor to pass through the enclosure, a portion of the conveyor being adjustable to vary the conveyor width and accommodate members of different widths, a curtain extending horizontally across at least one of the inlet and outlet ends to cover a portion thereof not occupied by the conveyor, one end of the curtain being connected to the adjustable conveyor portion for movement therewith when the conveyor width is adjusted.

36. Apparatus for wave soldering a member, comprising:
a solder reservoir,
means for forming a solder wave within the reservoir, the solder wave being horizontally elongated,
a conveyor for conveying the member along a direction of travel such that an underside thereof passes through the solder wave,
first and second gas plenums disposed adjacent opposite sides of the solder wave and extending substantially parallel thereto, each plenum including opposite longitudinal ends, and top and side walls extending between such ends, the side wall being disposed opposite the solder wave,
a delivery conduit extending longitudinally within each plenum for introducing shield gas into the plenum so that the plenum is pressurized with shield gas,
the side wall including orifice means being arranged to eject the pressurized shield gas toward the solder wave and being dimensioned to produce a substantial increase in the velocity of the shield gas.

37. Apparatus for wave soldering a member, comprising:
a solder reservoir;
means for forming a solder wave within the reservoir;
a conveyor for conveying the member along a direction of travel such that an underside thereof passes through the solder wave, a portion of the conveyor being adjustable to vary the conveyor width and accommodate members of different widths, an enclosure overlying the solder reservoir and including an inlet and outlet for a member being conveyed;
means for establishing an atmosphere of shield gas within the enclosure; and
a curtain extending horizontally across at least one of the inlet and outlet ends to cover a portion thereof not occupied by the conveyor, one end of the curtain being connected to the adjustable portion of the conveyor for movement therewith when the conveyor width is adjusted.

38. Apparatus according to claim 37, wherein an opposite end of the curtain is connected to a spring-biased roller to be rolled up or unrolled during conveyor width adjustment.

39. Apparatus for wave soldering a member, comprising:
a solder nozzle disposed in a solder reservoir;
a pump for ejecting an upward solder wave from the solder nozzle;
a conveyor for conveying the member such that an underside thereof passes through the solder wave;
a motor-driven shaft extending downwardly into the solder reservoir and operably connected to the pump; and
a stationary hollow sleeve extending downwardly below the solder surface, with the shaft extending through the sleeve, to restrict churning of solder to a region within the sleeve.

40. Apparatus according to claim 39 further including means for conducting pressurized shield gas into the sleeve to inert the solder being churned therein.

41. An inerting assembly adapted for use in a wave soldering apparatus to provide an inerting atmosphere, the assembly comprising a plenum having a top wall and two downwardly depending side walls extending between opposite longitudinal ends of the plenum, at least one of the side walls including orifice means formed therein, and a gas delivery conduit extending longitudinally within the plenum for introducing shield gas into the plenum.

* * * * *